US006427174B1

United States Patent
Sitaraman et al.

(10) Patent No.: US 6,427,174 B1
(45) Date of Patent: Jul. 30, 2002

(54) DYNAMIC IP ADDRESSING AND QUALITY OF SERVICE ASSURANCE

(75) Inventors: Aravind Sitaraman, Santa Clara; Joseph F. Mann, Los Gatos; Maria Alice Dos Santos, Redwood City; Shuxian Lou, San Jose; Sampath Kumar Sthothra Bhasham, Santa Clara, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/191,150

(22) Filed: Nov. 12, 1998

(51) Int. Cl.[7] .............................................. G06F 15/16
(52) U.S. Cl. ...................... 709/245; 709/250; 709/213; 709/214; 709/215
(58) Field of Search ................................ 709/213, 250, 709/214, 245, 215, 216, 217

(56) References Cited

U.S. PATENT DOCUMENTS

| 4,769,810 A | 9/1988 | Eckberg, Jr. et al. ......... 370/60 |
| 4,769,811 A | 9/1988 | Eckberg, Jr. et al. ......... 370/60 |

(List continued on next page.)

FOREIGN PATENT DOCUMENTS

WO 99/53408 10/1999 ........... G06F/15/16

OTHER PUBLICATIONS

Carrel, D. et al. The TACACS+ Protocol, Version 1.78, Cisco Systems, Inc., printed from ftp://ftp-eng.cisco.com/gdweber/tac-rfc.1.78.txt on Oct. 23, 2000.

Active Software, Inc., "Active Software's Integration System", printed from http://www.activesw.com/products/products.html, on Jul. 24, 1998.

Ascend Communications, Inc., "Access Control Product Information", 4 pages.

Ascend Communications, Inc., "Remote Access Network Security", printed from http://www.ascend.com/1103.html, on Jul. 24, 1998, pp. 1–8.

Droms, R., "Dynamic Host Configuration Protocol," Network Working Group, RFC 1531, Oct. 1993.

(List continued on next page.)

Primary Examiner—Zarni Maung
(74) Attorney, Agent, or Firm—Thelen Reid & Priest LLP; David B. Ritchie

(57) ABSTRACT

An address is allocated to a host device which is selected to obtain network access from any access point within a given communications system, while maintaining a network bandwidth management scheme that is consistently applied to a user's network bandwidth usage regardless of the access point used by the user. This is accomplished using a communications network having a at least one access point coupled to a first router which is configured to forward packets at a forwarding rate based on a source address contained in each of the packets. A user profile is assigned to each subscriber belonging to an access point. Each user profile includes a pool identifier which corresponds to a forwarding rate used by the router for packets corresponding to the subscriber. If a subscriber attempts to log-on to an access point, a source address is selected using the address pool identifier, the source address is assigned to the subscriber, and each packet is forwarded at a forwarding rate based on the source address contained within each of the packets. The communications system may also include a global memory which contains all of the user profiles stored for the communications system. The global memory provides the pertinent user profile to any access point from which a subscriber seeks to obtain access when the subscriber does not have a user profile contained within the local memory of the access point, such as in the case of a roaming subscriber.

14 Claims, 4 Drawing Sheets

U.S. PATENT DOCUMENTS

| | | | |
|---|---|---|---|
| 4,933,937 A | 6/1990 | Konishi | 370/85.13 |
| 5,014,265 A | 5/1991 | Hahne et al. | 370/60 |
| 5,224,099 A | 6/1993 | Corbalis et al. | 370/94.2 |
| 5,303,237 A | 4/1994 | Bergman et al. | 370/85.6 |
| 5,367,517 A | 11/1994 | Cidon et al. | 370/54 |
| 5,408,472 A | 4/1995 | Hluchyj et al. | 370/94.1 |
| 5,423,002 A | 6/1995 | Hart | 395/200 |
| 5,430,715 A | 7/1995 | Corbalis et al. | 370/54 |
| 5,502,725 A | 3/1996 | Pohjakallio | 370/94.1 |
| 5,509,006 A | 4/1996 | Wilford et al. | 370/60 |
| 5,570,360 A | 10/1996 | Klausmeier et al. | 370/60 |
| 5,570,361 A | 10/1996 | Norizuki et al. | 370/60.1 |
| 5,592,470 A | 1/1997 | Rudrapatna et al. | 370/320 |
| 5,596,744 A * | 1/1997 | Dao et al. | 395/610 |
| 5,610,910 A | 3/1997 | Focsaneanu et al. | 370/351 |
| 5,668,857 A | 9/1997 | McHale | 379/93.07 |
| 5,671,354 A | 9/1997 | Ito et al. | 395/187.01 |
| 5,678,006 A | 10/1997 | Valizadeh et al. | 395/200.02 |
| 5,699,521 A | 12/1997 | Iizuka et al. | 395/200.15 |
| 5,734,654 A | 3/1998 | Shirai et al. | 370/396 |
| 5,771,381 A * | 6/1998 | Jones et al. | 395/653 |
| 5,778,182 A | 7/1998 | Cathey et al. | 395/200.49 |
| 5,805,595 A | 9/1998 | Sharper et al. | 370/442 |
| 5,835,725 A * | 11/1998 | Chiang et al. | 709/228 |
| 5,835,727 A | 11/1998 | Wong et al. | 395/200.68 |
| 5,838,683 A | 11/1998 | Corley et al. | 370/408 |
| 5,852,607 A | 12/1998 | Chin | 370/401 |
| 5,854,901 A | 12/1998 | Cole et al. | 395/200.75 |
| 5,922,051 A | 7/1999 | Sidey | 709/223 |
| 5,926,458 A | 7/1999 | Yin | 370/230 |
| 5,959,990 A | 9/1999 | Frantz et al. | 370/392 |
| 5,970,477 A | 10/1999 | Roden | 705/32 |
| 5,991,828 A | 11/1999 | Horie et al. | 710/8 |
| 6,009,103 A | 12/1999 | Woundy | 370/401 |
| 6,026,441 A | 2/2000 | Ronen | 709/227 |
| 6,035,281 A | 3/2000 | Crosskey et al. | 705/14 |
| 6,052,725 A * | 4/2000 | McCan et al. | 709/223 |
| 6,081,840 A * | 6/2000 | Zhao | 709/224 |
| 6,091,951 A | 7/2000 | Sturniolo et al. | 455/432 |
| 6,119,160 A | 9/2000 | Zhang et al. | 709/224 |
| 6,119,171 A * | 9/2000 | Alkhatib | 709/245 |
| 6,175,869 B1 * | 1/2001 | Ahuja et al. | 709/226 |
| 6,253,327 B1 * | 6/2001 | Zhang et al. | 713/201 |

OTHER PUBLICATIONS

NAT and Networks, printed from http://www.csn.tu–chemnitz.de/~mha/linux–ip–nat/diplom/node4.html, on Sep. 19, 1998.

"NAT–PC Webopaedia Definition and Links", 1998, Mecklermedia Corporation, printed from http://webopedia.internet.com/TERM/N/NAT.html, on Sep. 19, 1998, 1 page.

"Network Address Translation Information", printed from http://www.uq.edu.au/~gadmacka/content/natinformation.htm, on Sep. 19, 1998.

Network Registrar, "Regain Confidence and Control Over Your IP Address Infrastructure", American Internet Corporation, Bedford, MA.

Network Registrar, "Hot Products & Solutions", American Internet Corporation, printed from http://www.american.com/networkregistrar, html, on Jul. 24, 1998.

Network Registrar, "Hot Products & Solutions—IP Address Management: A White Paper", American Internet Corporation, Bedford, MA, printed from http://www.american.com/ip–mgmt.html, on Jul. 24, 1998.

Network Registrar, "Hot Products & Solutions—Deploying Class of Service Using Network Registrar", American Internet Corporation, Bedford, MA, printed from http://american.com/applicationCOS–network.html, on Jul. 24, 1998.

Rigney, et al., "Remote Authentication Dial In User Service (RADIUS)", Network Working Group, RFC 2138, Apr. 1997, pp. 1–57.

"Three Ways to Manage IP Addresses", PC Magazine: IP Address Management, printed from http://www.zdnet.com/pcmag/features/ipmanage/ip–s2.htm, on Sep. 10, 1998.

* cited by examiner

DYNAMIC IP ADDRESSING AND QUALITY OF SERVICE ASSURANCE

BACKGROUND OF THE INVENTION

1. Field of the Invention

The present invention relates to managing addresses and network bandwidth. More particularly, the present invention relates to managing dynamically allocated addresses and applying in a consistent manner a quality of service scheme which manages network bandwidth associated with the dynamically allocated addresses.

2. The Background

As shown in FIG. 1, the Internet 10 (or another network) may be described as a group of interconnected computing networks (not shown) that are tied together through a backbone 12. The computing networks, in turn, provide access points, such as access points 14, 16 and 18, through which users may connect to the Internet 10 via a station (a computer having a connection to a network) or host, such as hosts 20, 22, 24, and 26. An access point is essentially a location on the Internet 10 that permits access to the Internet 10. An access point may include a modem pool (not shown) maintained by an ISP (Internet Services Provider) which enables its subscribers to obtain Internet access through a host having a dial-up connection. Those of ordinary skill in the art will recognize that other types of access methods may be provided by an ISP such as frame relay, leased lines, ATM (asynchronous transfer mode), ADSL, and the like.

Regardless of the access method used, each device (e.g., a host or router) that receives, sends and/or routes information between or among other devices on Internet 10 is configured to communicate with other devices using a communication protocol that may be understood by the other devices. The current communication protocol used by these devices on the Internet is TCP/IP (transmission control protocol/internet protocol). In addition, each device that can send or receive information (e.g., a host device) must also have a unique address. The type of address used for the Internet, or an equivalent switched network that uses TCP/IP, is commonly referred to as an IP address. A standard TCP/IP address is presently 32 bits in length, providing a total of $2^{32}$ possible IP addresses. Those of ordinary skill in the art will readily recognize that not all of these possible IP addresses are available due to administrative expediencies, such as reserving blocks of IP addresses for future use.

Sending or receiving information using the TCP/IP protocol requires encapsulating information into packets. Each packet includes a header and a payload. The header contains information related to the handling of the payload by a receiving host or routing device, while the payload contains part or all of the user information. The information in the header includes the sender's and the recipient's addresses and is used to route the packet through the Internet until the packet is received by a host having an IP address that matches the packet's destination address. (When referring to the source address and destination address of a packet, the source address and destination address are commonly referred to as "SA" and "DA", respectively.) This approach enables users to accurately exchange information with one another through their respective host computers.

By implementing a protocol common to all devices using Internet 10, users may send and receive information with other users on the Internet in a seamless manner regardless of geographic location or the type of host and/or interconnected network used. This ability for users to access or provide information to others regardless of geographic boundaries is one factor fueling the rapid increase in the number of users using Internet 10. This increase has depleted the number of addresses and has increased the amount of packet traffic on Internet 10.

One solution for mitigating the effect of the number of users requiring addresses is to dynamically allocate addresses for users who do not have dedicated connections to Internet 10, such as users who use dial-up access methods to connect to an ISP. Dynamic allocation of IP addresses entails having a pool of IP addresses, such as IP address pool 32, from which an ISP, such as ISP 34 can draw each time a valid subscriber (who does not use a dedicated connection or a connection that does not have a framed IP address, i.e., a static IP address) seeks to access the Internet. Once the subscriber logs on to an ISP and is properly authenticated, the ISP allocates an IP address for use by the user. Upon log-off, the assigned/allocated IP address is then released, rendering that IP address available for subsequent use by another user. In this way, a set of IP addresses can be used to provide access to a number of users that exceed the number of IP address comprising the IP address pool, assuming that at any given time the number of users seeking to log-on and obtain dynamic IP addresses is less than or equal to the number of IP addresses available in the IP address pool.

Attempting to mitigate the effect of high levels of packet traffic on the Internet has resulted in different solutions. One solution, albeit an expensive one, is to increase bandwidth throughout the Internet such as by providing an Internet backbone that has a higher bandwidth, i.e., providing a larger pipe. Another solution is to manage bandwidth used by Internet users according to some defined set of criteria so as to decrease the latency period experienced by a packet while being routed from an access point to an Internet backbone. This approach is commonly known as QoS (Quality of Service). QoS may be thought of as a solution that does not create a bigger pipe through which packets may flow but a solution that picks which packets will go first, i.e., some packets have precedence over others.

Packet precedence may be based on the address used by a user's host machine. For example, a user may have service level agreement with an ISP that requires ISP 34 to give precedence to packets associated with the user. Packets given precedence are selected according to the source address held by each packet. To ensure that precedence is provided consistently, the user is given a static or permanent IP address that when encapsulated in a packet and received by a router, such as router 36, is given precedence over another user that does not have the same service level agreement. This decreases transmission delay experienced by packets originating from the user's host machine when being routed from access point 14 onto the Internet backbone 12.

However, basing QoS or precedence on a static IP address precludes ISPs from using dynamically assigned IP addresses because the same user may have different addresses each time the user logs on. Moreover, if the same user decides to obtain Internet access at an area serviced by a access point (sometimes referred to as a PoP or "Point of Presence"), provided by the same or different ISP, the ISP will not know the user's static IP address. Static IP addresses are not shared between access points, such as access points 14 and 16, that are connected to Internet backbone 12. This precludes the ISP from providing the same QoS to its user simply because the user is a roaming user (i.e. a user that uses an access point that is other than the user's home PoP location) even though the PoP or access point is serviced by the same ISP that services the user's home PoP.

Accordingly there is a need for managing the dynamic allocation of an address to a host device which is selected to obtain network access from any access point within a given communications network. Further, there is a need for maintaining a network bandwidth management scheme that is consistently applied to a user's network bandwidth usage regardless of the access point used by the user.

SUMMARY OF THE INVENTION

In a first aspect of the present invention, an address is allocated to a host device which is selected to obtain network access from any access point within a given communications system, while maintaining a network bandwidth management scheme that is consistently applied to a user's network bandwidth usage regardless of the access point used by the user. This is accomplished using a communications network having at least one access point associated with a forwarding device, such as a router, which is configured to forward packets at a forwarding rate based on a source address contained in each of the packets. A user profile is assigned to each subscriber belonging to an access point. Each user profile includes a pool identifier which corresponds to a forwarding rate to be used by the forwarding device for packets transmitted by the subscriber. If a subscriber attempts to log-on to an access point, a source address is selected from an address pool using the address pool identifier, the source address is assigned to the subscriber, and each packet is forwarded at a forwarding rate based on the source address contained within each of the packets.

In a second aspect of the present invention, the communications system includes a global memory which contains all of the user profiles stored for the communications system. The global memory provides the pertinent user profile to any access point from which a subscriber seeks to obtain access when the subscriber does not have a user profile contained within the local memory of the access point, such as in the case of a roaming subscriber.

DETAILED DESCRIPTION OF A PREFERRED EMBODIMENT

In the following description, a preferred embodiment of the invention is described with regard to preferred process steps and data structures. However, those skilled in the art will recognize, after perusal of this application, that embodiments of the invention may be implemented using at least one general purpose computer operating under program control, and that modification of the general purpose computer to implement the components, process steps, and/or data structures described herein would not require undue invention.

In accordance with a presently preferred embodiment of the present invention, the components, process steps, and/or data structures are implemented using C++ programs running on an Enterprise 2000 server™ running SunSolaris™ as its operating system. The Enterprise 2000 server™ and SunSolaris™ operating system are available from Sun MicroSystems, Inc. of Mountain View, Calif. This implementation is not intended to be limiting in any way. Different implementations may be used and may include other types of operating systems, computing platforms, and/or computer programs. In addition, those of ordinary skill in the art will readily recognize that devices of a less general purpose nature, such as hardwired devices, devices relying on FPGA (field programmable gate array) or ASIC (application specific integrated circuit) technology, or the like, may also be used without departing from the scope and spirit of the inventive concepts disclosed herewith.

Figure 1:
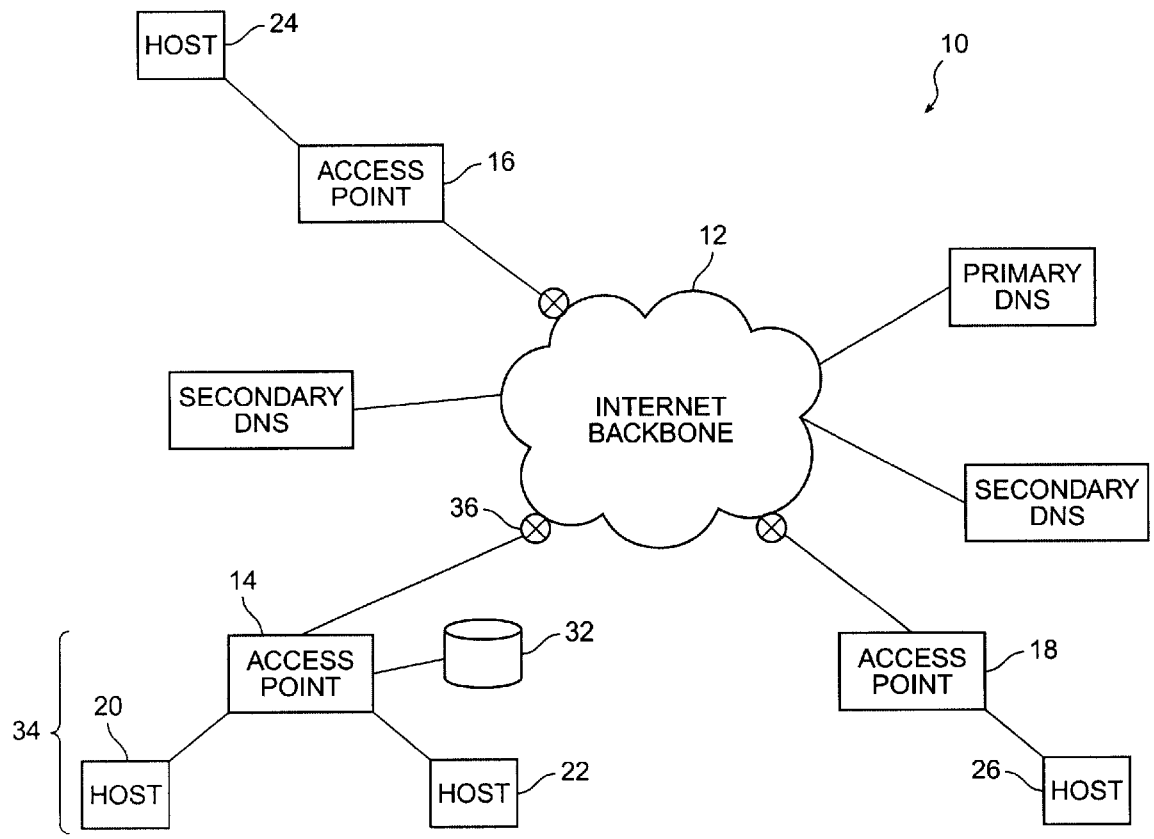
FIG. 1 is a block diagram of the Internet or a similar computer network.
Figure 2:
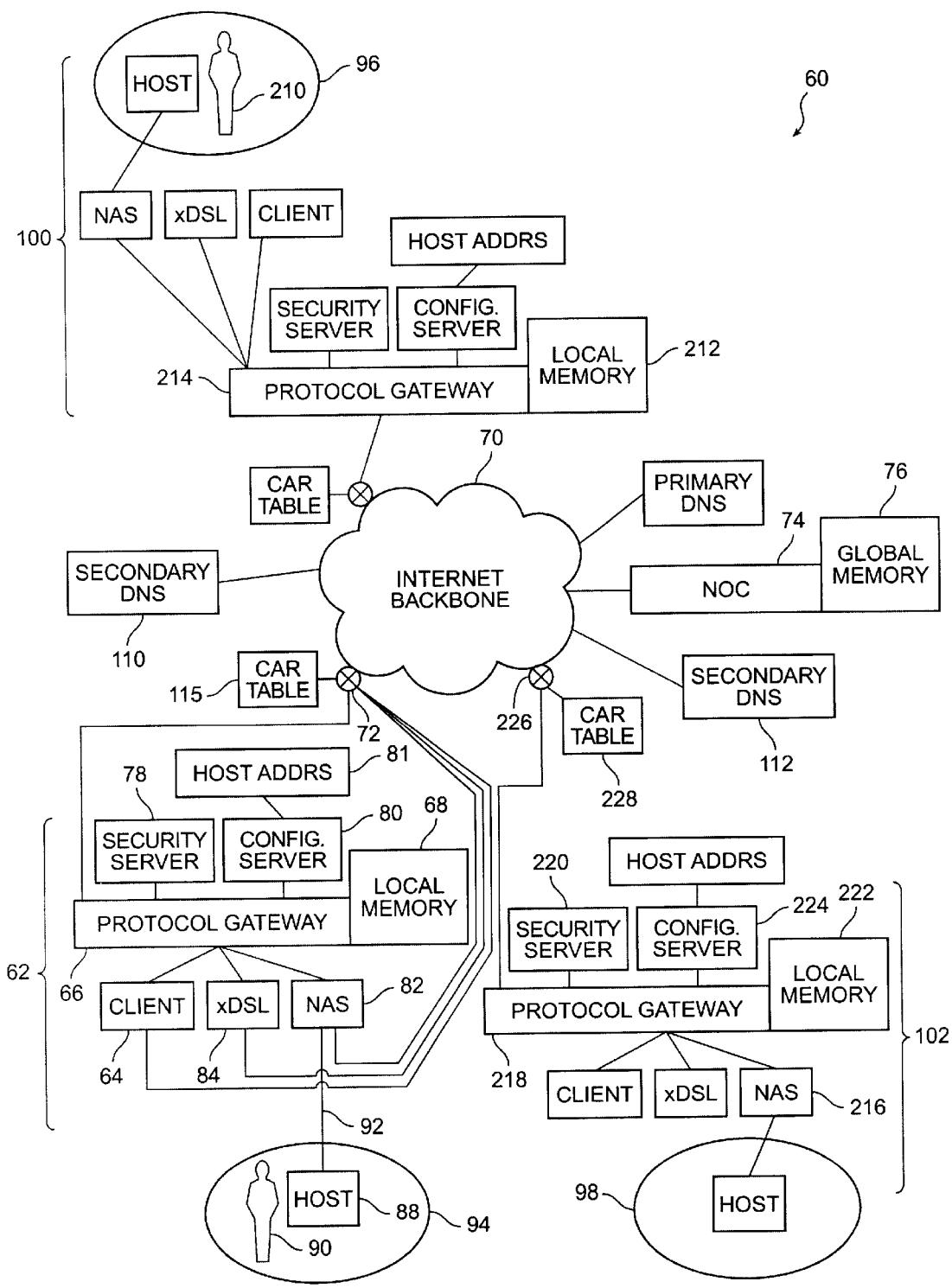
FIG. 2 is a block diagram of a communications system providing dynamic allocation of addresses to a user at any access point within the communications system, while maintaining a network bandwidth management scheme, such as QoS, that is consistently applied to a user's network bandwidth usage regardless of the access point used by the user in accordance with a presently preferred embodiment of the present invention.

FIG. 2 is a block diagram of a communications system providing dynamic allocation of an address to a user at any access point within the system, while maintaining a network bandwidth management scheme, such as QoS, that is consistently applied to a user's network bandwidth usage regardless of the access point used by the user in accordance with a presently preferred embodiment of the present invention.

Communications system 60 includes at least one access point 62 having at least one client 64 and a protocol gateway 66 having a local memory 68. Client 64 and protocol gateway 66 are shown coupled to a switched backbone 70 via a router 72. Communications system 60 also includes a network operations center 74 having a global memory 76, at least one security server 78, and a configuration server 80 having a pool of addresses 81 for dynamic allocation.

Local memory 68 and global memory 76 are intended to store the subscriber information (user profiles) and are implemented as memory caches although such an implementation is not intended to be limiting. Other types of memory may be used which preferably offer low memory latency. Protocol gateway 66 functions as an interface that allows access requests received from client 64 to be serviced using components that may communicate using different protocols, such as security server 78 and configuration server 80.

Switched backbone 70 is any high bandwidth medium that allows data to be passed from one access point to another access point. In accordance with a presently preferred embodiment of the present invention, switched backbone 70 is implemented by using an Internet backbone. The use of an Internet backbone is not intended to be limiting in any way. Other types (or any number) of backbones, WANs (wide area networks), or equivalent networks, may be used as long as it supports the communication protocols used by devices which connect to the backbone, such as TCP/IP based protocols or equivalent.

Access point 62 represents a location within communications system 60 to which stations or hosts may connect to obtain communication services provided by communications system 60. Access point 62 is associated with at least one client which is capable of communicating with a host employed by a user to establish a session with communications system 60. In accordance with a presently preferred embodiment of the present invention, at least one of the clients is capable of providing dial-up services, such as PPP (point to point protocol), SLIP (serial line internet protocols), rlogin, telnet, ftp (file transfer protocol), and the like. Additional clients may also be implemented for providing other types of services, such as an ADSL 84 (Asynchronous Digital Subscriber Line) client and/or its digital subscriber line equivalents, e.g., RADSL, VDSL, HDSL, and SDSL; Voice Over IP; or any other equivalent client. It is presently contemplated that each of the clients will communicate with protocol gateway 66 using the RADIUS (Remote Authentication Dial In user Service) protocol. However, other types of protocols may also be used as well, such as TACAS+ or Diameter. RADIUS, TACAS+, and Diameter are protocols known by those of ordinary skill in the art and thus, will not be further discussed other than in the context of the present invention in order to avoid over-complicating the disclosure.

In accordance with a presently preferred embodiment of the present invention, the client used for supporting dial-up services is a network access server 82 (NAS). As known by those of ordinary skill in the art, a network access server is capable of supporting TCP/IP-based dial-up services. The use of a network access server is not intended to be limiting in any way. Other types of clients may be used. Moreover, the use of TCP/IP-based dial-up services is also not intended to be limiting in any way. Any other type of dial-up service using a different protocol may be implemented as long as the protocol is compatible with the pertinent devices used in communications system 60.

Those of ordinary skill in the art will recognize that dial-up access to network access server 82 by a user 90 through host 88 may be accomplished by using a modem (not shown) coupled to a POTS (plain old telephone system) network 92. Providing and establishing a TCP/IP-based dial-up connection is well known by those of ordinary skill in the art. Using host 88 having a modem connected to network access server 82 is not intended to limit the present invention in any way. Other equivalent devices may be implemented. For example, host 88 may alternatively be provided using a server providing modem services to devices on a LAN (not shown), or any equivalent device that permits a user to obtain a dial-up session with network access server 82.

Access point 62 enables a network services provider, such as an ISP (Internet Services Provider), to provide a point of presence (PoP) to users within a given geographical area. Communication system 60 is shown having PoP 94, 96, and 98 where PoP 94 is provided by access point 62 and PoP 96 and 98 are provided by access points 100 and 102, respectively. Access points 100 and 102 are similar to access point 62 because they are also associated with at least one client. The number of PoPs shown is not intended to limit the present invention in any way and any number of PoPs may be included in communications system 60.

Since, in the preferred embodiment, switched backbone 70 is implemented as an Internet backbone, a Domain Name Server (DNS) is used to return Internet domain names that correspond to an address received from an access point. For example, if DNS 110 receives an IP address from access point 62 through protocol gateway 66, it returns the domain name corresponding to that IP address. Alternatively, if DNS 110 receives a domain name from protocol gateway 66, it returns the IP address that corresponds to that domain name.

Those of ordinary skill in the art will recognize that there are many domain name servers used on the Internet. The domain name servers support a group of access points that provide PoPs within adjacent geographical areas. For example, domain name server 110 in FIG. 2 may support access points 62 and 100, where access points 62 and 100 support the metropolitan areas of San Jose and San Francisco, respectively. Domain name server 112 may support access point 102 which may be located in a different geographical area such as the tri-state area covered by Northern New Jersey, Southern Connecticut, and Southern New York.

Routers, such as router 72, used by the access points in communications system 60 forward packets at a rate based on a specified criteria, such as forwarding the packets according to an order of precedence based on the specified criteria. In accordance with a presently preferred embodiment of the present invention, the specified criteria is based on the source address contained in a packet. Router 72 operates under a committed access rate (CAR) which requires it to forward packets having a certain source address at a selected rate. This may require router 72 to provide precedence to at least one packet over another packet in order to maintain the committed access rate for the packet given precedence. This ensures that packets that have payloads which are sensitive to transmission latency, such as video data, voice data, or equivalent data, such as data that require "real time" presentation to a recipient, are routed first. Packets carrying text data are not greatly affected by routing latency as compared to video data and voice data, and thus, may be safely routed after packets carrying such time-sensitive data.

In accordance with a presently preferred embodiment of the present invention, each router configured to provide a committed access rate includes a CAR look-up table (or equivalent memory) which holds a list of addresses which are categorized according to committed access rates. When a packet is received by router 72 from a client 64, such as network access server 82, the source address of the packet is compared with the addresses listed in CAR look-up table 115. If a match is found, the committed access rate for that address is then provided. If prior packets are queued ahead of the packet and the committed access rate for the packet cannot be met without the packet taking precedence over the prior packets in the queue, then the packet is given precedence for forwarding over packets having lower precedence. As shown in FIG. 2, each client used in access point 62, such as network access server 82, is not only coupled to protocol gateway 66 but is also coupled to router 72. It is intended that the clients used in access points 100 and 102 be coupled as well to their respective routers but this connection is not shown in order to avoid overcomplicating FIG. 2.

Using precedential routing to provide a committed access rate for a router in communications system 60 is not intended to be limiting in any way. Other types of bandwidth management or Quality of Service (QoS) may be implemented alone or in conjunction with precedential routing, such as through the use of the resource reservation protocol, weighted fair queuing, and others.

Also, using a router or a CAR look-up table is not intended to be in any way limiting. Other types of devices may be used to forward packets at a rate based on the a specified criteria, such as the source address contained by the packets to be forwarded.

Figure 3:
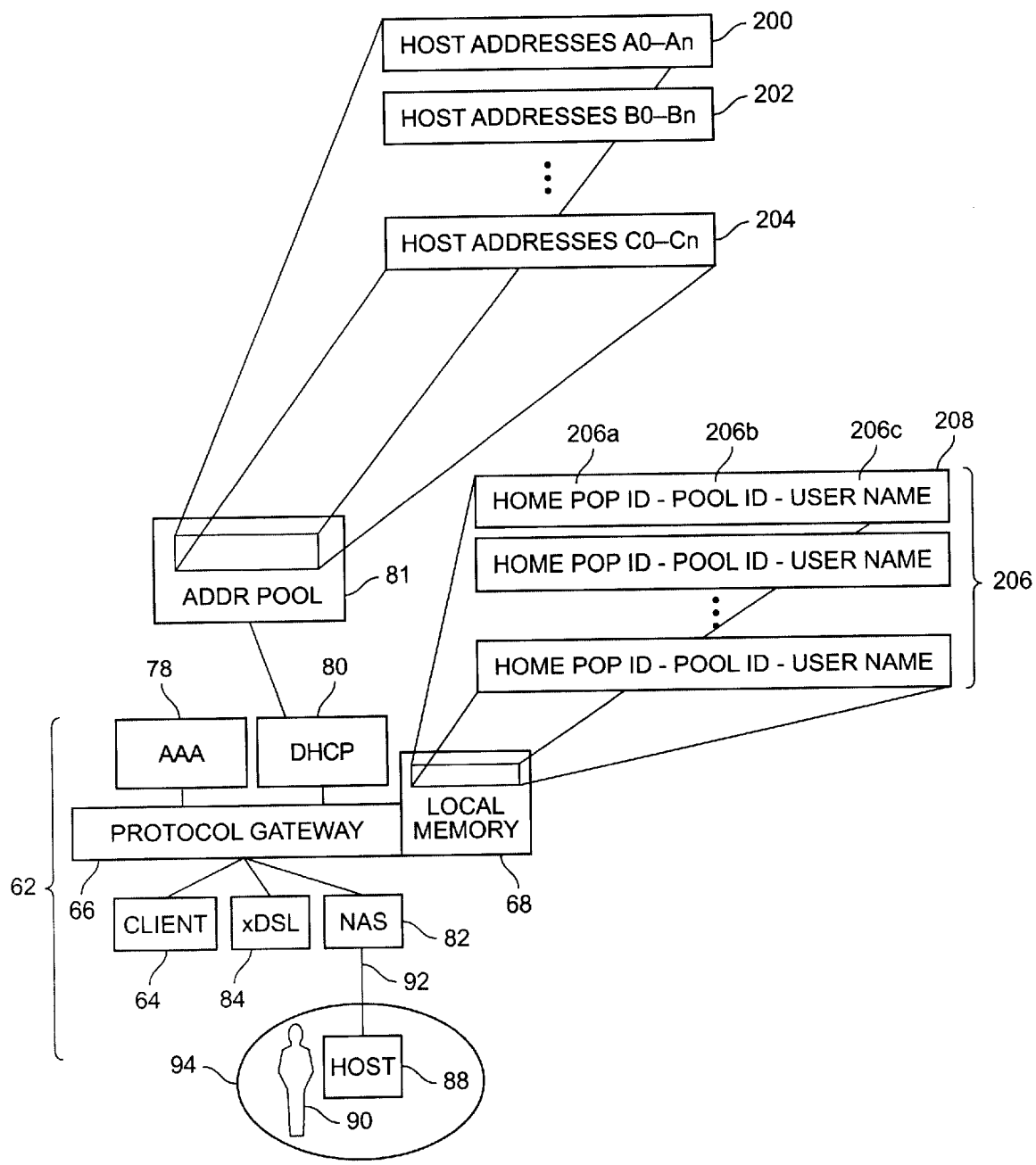
FIG. 3 is an expanded view of an access point, protocol gateway, security server, and configuration server in accordance with a presently preferred embodiment of the present invention.

FIG. 3 is an expanded view of an access point, protocol gateway, security server, and configuration server in accordance with a presently preferred embodiment of the present invention.

Configuration server 80 is shown having a plurality of address pools 81. Configuration server 80 allocates (or de-allocates) addresses from plurality of address pools 81 to subscribers through clients such as network access server 82. Plurality of address pools 81 has at least two address pools or groups, such as group A (200), group B (202), and group C (204). The number of groups used is not intended to be in any way limiting and is disclosed as a preferred embodiment only. In accordance with a presently preferred embodiment of the present invention, configuration server 80 is a Dynamic Host Configuration Protocol (DHCP) server, which is known to those of ordinary skill in the art. The type of addresses maintained by a DHCP server are IP addresses.

Local memory 68 stores a set of user profiles 206. A user profile includes one home PoP identifier 206a, a pool identifier 206b, and a user name 206c for each subscriber belonging to a PoP serviced by an access point. For example, user profile 208 would be created for subscriber 90 since subscriber 90 belongs to PoP 94. The user profile of a subscriber 210 that belongs to another PoP, such as PoP 96, is not stored within local memory 68 but is stored in local memory 212 associated with protocol gateway 214, as shown in FIG. 2.

A home PoP identifier assigned to a user corresponds to the ISP to which the user is subscribed. For example, subscriber/user 90 would have a home PoP identifier corresponding to the ISP servicing PoP 94. The pool identifier reflects the type of network service contracted for by the subscriber with the subscriber's ISP and is used to determine what type of address to allocate to the subscriber when the subscriber logs on. For example, if subscriber 90 requires a connection that is well-suited for video data (or any data that needs to be presented in approximately real-time), the subscriber will be given a pool identifier that will be used to select an address, which upon use by subscriber 90 will be given a committed access rate by router 72 that reflects the service contracted for by subscriber 90 with the subscriber's ISP.

During selected intervals, such as when a local memory is updated with new user profiles, the user profiles held by the local memory are sent and stored within global memory 76. Global memory 76 contains all of the user profiles from each local memory in communications systems 60. For example, referring again to FIG. 2, the user profiles in local memory 68, 212, and 216 are stored and maintained in global memory 76. This permits subscriber 90 to roam (i.e., to use the services offered by PoPs 96 and 98) and still be allocated an address that will be given the same committed access rate originally contracted for between subscriber 90 and PoP 94.

For example, if a subscriber seeks a connection through PoP 98, such as through a point to point (PPP) dial-up session with a network access server 216, network access server 216 will send an access request to protocol gateway 218. Protocol gateway 218, in turn, will send an access request to a security server 220. In accordance with a presently preferred embodiment of the present invention, a security server 78 is an authentication, authorization, and accounting (AAA) server. An authentication, authorization and accounting server is responsible for receiving user access requests, authenticating the user and then returning all configuration information necessary for a network access server (or equivalent client) to deliver service to the user. Such servers also keep track of network utilization for use in accounting functions as well known to those of ordinary skill in the art.

In accordance with a presently preferred embodiment of the present invention, the security servers described herein are implemented using a RADIUS protocol based server. However, other types of authentication, authorization, and accounting protocols may also be used as well, such as TACAS+ or Diameter discussed above.

Upon receipt of the access request, security server 220 will attempt to access a user profile from local memory 222. Since the subscriber 90 is not subscribed to PoP 98, the user profile corresponding to subscriber 90 will not be available locally, and hence, the attempt to obtain the user profile will fail. This will result in local memory 222 requesting the user profile from the network operating center 74. The network operation center 74 searches global memory 76 for the user profile corresponding to subscriber 90 and when it is found, returns it to local memory 222 which provides it to security server 220. In accordance with a presently preferred embodiment of the present invention, local memory 222 and global memory 76 communicate via a RADIUS protocol. This application layer protocol is used in conjunction with the UDP (user datagram protocol) and IP protocols to support network communication between local memory 222 and global memory 76.

UDP is a transport level, unreliable, connectionless protocol. The term "unreliable" is commonly used to describe a protocol which does not correct for dropped, duplicate, and/or out of order packets—thus, applications using UDP will need to provide their own mechanisms for ensuring proper packet delivery and reception, if desired. The lack of error correction is not a major disadvantage, however, because there are very few transmission errors on modem networks and designers have leeway in the amount of transmission error control they want to implement in their applications. This renders UDP an efficient solution for applications that require very simple exchanges, such as exchanges that include one reply following every query. To impose error correction in such a connection would not be efficient because the connection would have to be torn down immediately after a single packet exchange. The term "connectionless" is commonly used to describe a protocol which does not rely on a predefined circuit for transmission. UDP is known to those of ordinary skill in the art and therefore will not be further described herein to avoid overcomplicating the disclosure.

Upon proper authentication and authorization, an address request is generated to configuration server 224 to provide an address that corresponds to the pool identifier found with the user profile obtained from global memory 76. This address will eventually be provided to host 216. Upon receipt of packets from host 216, router 226 will forward the packets at a committed access rate listed for the packets within a committed access rate table 228. In accordance with a presently preferred embodiment of the present invention, the address request is based on the UDP protocol. The use of the UDP protocol is not intended in any way to the limit the present invention. Any other protocol may be used as long as the functions of requesting, allocating, and de-allocating addresses can be sought from and provided by configuration server 80.

Figure 4:
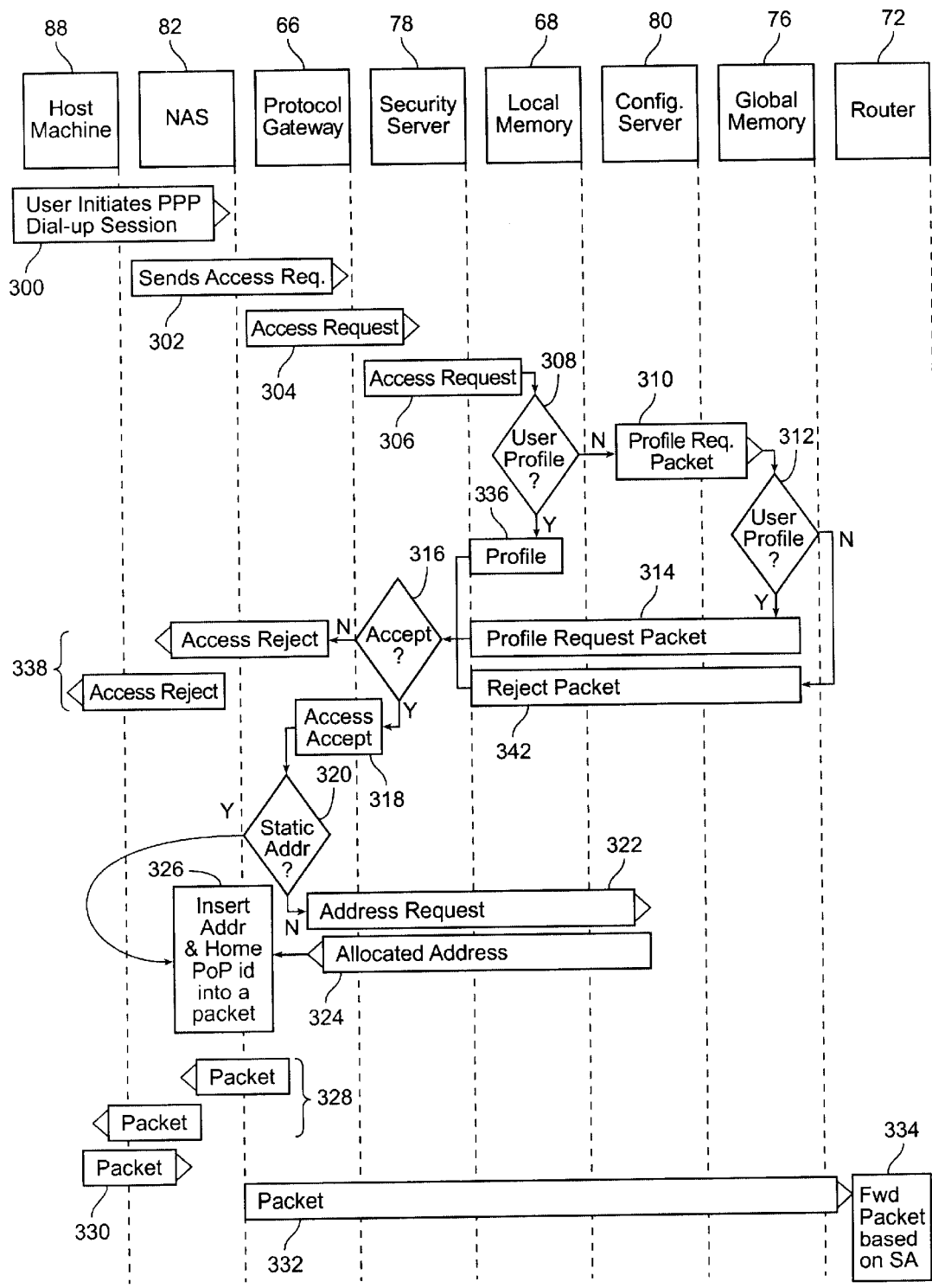
FIG. 4 is a flow diagram illustrating components and a process for dynamically providing an address to a host device used by subscriber to obtain network access and for managing data traffic between the access point and a switched backbone in accordance with a presently preferred embodiment of the present invention.

FIG. 4 is a flow diagram illustrating components and a process for dynamically providing an address to a subscriber and for managing data traffic between the access point and a switched backbone in accordance with a presently preferred embodiment of the present invention.

The components listed in FIG. 4 reflect the components described in FIGS. 2 and 3. As described above, host 88 and network access server 82 communicate using a TCP/IP based connection, such as PPP ("point to point protocol").

Network access server 82, protocol gateway 66, and authentication server 78 communicate with each other using an authentication protocol, such as RADIUS, TACAS+, or Diameter, although in the preferred embodiment of the present invention the RADIUS protocol is used as the authentication protocol. Protocol gateway 66 communicates with local memory 68 through CORBA although any other type of protocol may be used. CORBA is a protocol known by those of ordinary skill in the art.

At reference number 300, a subscriber, such as subscriber 90, attempts through host machine 88 to establish a connection with network access server 82. This results in network access server 82 receiving an access request from host machine 88 which includes the subscriber's user name or other identification information.

At reference number 302, network access server 82 responds by generating an access request and directs it to protocol gateway 66. The type of access request sent to protocol gateway 66 conforms to the protocol used to communicate between network access server 82 and protocol gateway 66. In the preferred embodiment of the present invention, RADIUS is the protocol used and hence, a RADIUS access request is the type of request generated by network access server 82.

At reference number 304, protocol gateway directs the access request generated by network access server 82 to security server 78.

At reference number 306, security server 78 forwards the access request to local memory 68.

At reference number 308, local memory 68 determines whether a user profile having the subscriber's user name exists. If not, the process flow proceeds to reference number 310.

At reference number 310, local memory 68, through protocol gateway 66, sends a packet containing a query to global memory 76 to determine whether global memory 76 contains a user profile corresponding to subscriber 90. In accordance with a presently preferred embodiment of the present invention, the packet is based on a RADIUS protocol. This protocol is used in conjunction with the UDP and IP protocols to support network communication between local memory 68 and global memory 76. However, those of ordinary skill in the art will recognize that other types of communication protocols may be used which will enable a local memory to perform a query function that is equivalent to the act(s) performed in reference number 310 without departing from the inventive concepts disclosed herein.

At reference number 312, upon receipt, global memory 76 determines whether it contains a user profile corresponding to subscriber 90. If so, the process flow proceeds to reference number 314.

At reference number 314, global memory 76 returns the subscriber's user profile as a packet to protocol gateway 66 which directs the packet to security server 78.

At reference number 316, security server 78 determines whether to accept or reject the access request based upon the information contained within the user profile provided by the packet and various other criteria such as the time of day the session is being requested, the number of open sessions, and the like. If authorization server 78 accepts the access request, the process flow proceeds to reference number 318.

At reference number 318, security server 78 returns an access-accept packet, which includes the user profile returned by global memory 76 at reference number 314, to protocol gateway 66. In accordance with a presently preferred embodiment of the present invention, the access-accept packet is based on the RADIUS protocol and includes an extended vender specific attribute for holding the pool identifier contained in the user profile.

At reference number 320, protocol gateway 66 receives the packet and uses the access-accept packet to ascertain whether a static or dynamic address, such as an IP address, should be allocated to subscriber 90. If a dynamic address is required, protocol gateway 66 proceeds to reference number 322. In accordance with a presently preferred embodiment of the present invention, the determination as to whether a static or dynamic address should be allocated is based on whether the access-accept packet includes a Framed-IP-Address attribute. If a Framed-IP Address attribute is not included, protocol gateway 66 assumes that a dynamic address is required.

At reference number 322, protocol gateway 66 attempts to procure an address for subscriber 90 by obtaining from the access-accept packet a pool identifier and using the pool identifier to make a request to configuration server 80 for an address that corresponds to the pool identifier.

At reference number 324, configuration server 80 returns an address that corresponds to the pool identifier by allocating an available address that belongs within an address pool corresponding to the pool identifier.

At reference number 326, protocol gateway 66 receives the allocated address and inserts the address and home PoP identifier into a control packet. In accordance with a presently preferred embodiment of the present invention, the control packet is based on the RADIUS protocol although other types of protocols may be used as long as the protocol chosen is supported by the receiving device, such as network access server 82.

At reference number 328, protocol gateway 66 sends the packet containing the address and the PoP identifier to network access server 82, which in turn, forwards the packet to host 88.

At reference number 330, host 88 receives the address and uses it as a source address for each packet transmitted to network access server 82, or equivalent client, for forwarding to a backbone router, such as router 72.

At reference number 332, network access server 82 receives the packets transmitted by host 88 and forwards them to router 72.

At reference number 334, upon receipt, router 72 determines the source address contained within each packet and forwards the packets at a forwarding rate corresponding to the source address. In accordance to a presently preferred embodiment of the present invention, the forwarding rate is determined by using the source address as an index to a look up table which contains a forwarding rate defined for the source address. The forwarding rate is then used as the minimum rate in which the packets are to be forwarded.

If, at reference number 308, a user profile was found in local memory 68, the process flow proceeds to reference number 336. At reference number 336, the user file is sent to security server 78 and the process flow proceeds to reference number 316.

If, at reference number 316, security server 78 determines (using the returned user profile) that authorization should not be given to subscriber 90, the process flow proceeds to reference number 338.

At reference number 338, security server generates an access reject packet and sends it to protocol gateway 66 which sends it to network security server 82 which in turn, forwards it to host 88.

If, at reference number 312, global memory 76 determines that it does not contain a user profile corresponding to subscriber 90, the process flow proceeds to reference number 342. At reference number 342, global memory 76 notifies security server 78 that authorization is denied by sending a reject packet. The process flow then proceeds to reference number 316.

If, at reference number 320, protocol gateway 66 determines that the access-accept packet includes a user profile indicating that subscriber 90 is to receive a static address, it obtains the static address and provides it for encapsulation at reference number 326. In accordance with a presently preferred embodiment of the present invention, the determination as to whether a static (or dynamic) address should be allocated is based on whether the access-accept packet includes a Framed-IP-Address attribute. If a Framed-IP Address attribute is present, protocol gateway 66 treats the Framed-IP Address attribute as the static address.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

We claim:

1. A method for allocating addresses to subscribers on a communications system having at least one router configured to forward packets transmitted by said subscribers at a minimum rate selected using an address contained in said packets, said method comprising:

assigning to a subscriber a user profile containing a pool ID;

initiating an access request process in response to an access request by said subscriber;

checking a local memory for said user profile;

assigning said subscriber an IP address from an IP address pool identified by said pool ID if said user profile is contained in said local memory; and querying a global memory for said user profile if said user profile is not contained in said local memory, and assigning said subscriber an IP address from an IP address pool identified by said pool ID if said user profile is contained in said global memory.

2. A communication system comprising:

an access point;

a local memory holding user profiles of subscribers to the communication system, each user profile including at least a user ID and a pool ID, said local memory configured to provide a pool ID in response to a query from said access point identifying a user ID for which a user profile exists in said local memory;

a global memory holding user profiles of subscribers to the communication system, said global memory configured to provide a pool ID in response to a query from said access point identifying a user ID for which a user profile exists in said global memory; and a plurality of address pools associated with said access point wherein a user is assigned an IP address from an IP address pool within said plurality of address pools, said address pool selected in response to said pool ID.

3. A communications system comprising:

an access point;

a local memory associated with said access point;

a global memory coupled to said local memory and responsive to storing a user profile corresponding to a subscriber and containing a pool ID;

a plurality of address pools accessible to said access point;

a forwarding device that forwards a packet sent by said subscriber according to a source address contained in the packet; and wherein said global memory provides said pool ID to said local memory if said user profile is not contained in said local memory during an access attempt by said subscriber to the communications system through said access point, said pool ID used to select an IP address pool from said plurality of address pools.

4. A method for allocating addresses to network subscribers comprising:

assigning to a subscriber a user profile containing a pool ID;

initiating an access request process in response to an access request by said subscriber;

checking a local memory for said user profile;

assigning said subscriber an address from an address pool identified by said pool ID if said user profile is contained in said local memory;

querying a global memory for said user profile if said user profile is not contained I said local memory, and assigning said subscriber an IP address from an IP address pool identified by said pool ID if said user profile is contained in said global memory; and forwarding packets transmitted by said subscriber at a minimum rate selected in response to said IP address.

5. A method for operating a network operations center coupled to a communications system having a router that forwards packets received from a client according to the source address of said packets, said method comprising:

receiving and storing a user profile having a pool identifier in a global memory, said pool identifier comprising an IP address pool; and responding to a request for said user profile from a first local memory coupled to a protocol gateway by transmitting said user profile to said first local memory.

6. An apparatus for operating a network operations center coupled to a communications system having a router that forwards packets received from a client according to the source address of said packets, said apparatus comprising:

receiving and storing a user profile having a pool identifier in a global memory;

responding to a request for said user profile from a first local memory coupled to a protocol gateway by transmitting said user profile to said first local memory; and responding to a request for said user profile from a second local memory coupled to a second protocol gateway by transmitting said user profile to said second local memory.

7. An apparatus for allocating addresses to subscribers on a communications system having at least one router configured to forward packets transmitted by said subscribers at a minimum rate selected using an address contained in said packets, said apparatus comprising:

means for assigning to a subscriber a user profile containing a pool ID;

means for initiating an access request process in response to an access request by said subscriber;

means for checking a local memory for said user profile;

means for assigning said subscriber an IP address from an IP address pool identified by said pool ID if said user profile is contained in said local memory; and means for querying a global memory for said user profile if said user profile is not contained in said local memory, and assigning said subscriber an IP address from an IP address pool identified by said pool ID if said user profile is contained in said global memory.

8. A program storage device readable by a machine, embodying a program of instructions executable by the machine to perform a method for allocating addresses to subscribers on a communications system having at least one router configured to forward packets transmitted by said subscribers at a minimum rate selected using an address contained in said packets, the method comprising:

assigning to a subscriber a user profile containing a pool ID;

initiating an access request process in response to an access request by said subscriber;

checking a local memory for said user profile;

assigning said subscriber an IP address from an IP address pool identified by said pool ID if said user profile is contained in said local memory; and querying a global memory for said user profile if said user profile is not contained in said local memory, and assigning said subscriber an IP address from an IP address pool identified by said pool ID if said user profile is contained in said global memory.

9. An apparatus for allocating addresses to network subscribers, the apparatus comprising:

means for assigning to a subscriber a user profile containing a pool ID;

means for initiating an access request process in response to an access request by said subscriber;

means for checking a local memory for said user profile;

means for assigning said subscriber an IP address from an IP address pool identified by said pool ID if said user profile is contained in said local memory;

means for querying a global memory for said user profile if said user profile is not contained in said local memory, and assigning said subscriber an IP address from an IP address pool identified by said pool ID if said user profile is contained in said global memory; and means for forwarding packets transmitted by said subscriber at a minimum rate selected in response to said IP address.

10. A program storage device readable by a machine, embodying a program of instructions executable by the machine to perform a method for allocating addresses to network subscribers, the method comprising:

assigning to a subscriber a user profile containing a pool ID;

initiating an access request process in response to an access request by said subscriber;

checking a local memory for said user profile;

assigning said subscriber an IP address from an IP address pool identified by said pool ID if said user profile is contained in said local memory;

querying a global memory for said user profile if said user profile is not contained in said local memory, and assigning said subscriber an IP address from an IP address pool identified by said pool ID if said user profile is contained in said global memory; and forwarding packets transmitted by said subscriber at a minimum rate selected in response to said IP address.

11. An apparatus for operating a network operations center coupled to a communications system having a router that forwards packets received from a client according to the source address of said packets, said apparatus comprising:

means for receiving and storing a user profile having a pool identifier in a global memory, said pool identifier comprising an IP address pool; and means for responding to a request for said user profile from a first local memory coupled to a protocol gateway by transmitting said user profile to said first local memory.

12. An apparatus for operating a network operations center coupled to a communications system having a router that forwards packets received from a client according to the source address of said packets, said apparatus comprising:

means for receiving and storing a user profile having a pool identifier in a global memory;

means for responding to a request for said user profile from a first local memory coupled to a protocol gateway by transmitting said user profile to said first local memory; and means for responding to a request for said user profile from a second local memory coupled to a second protocol gateway by transmitting said user profile to said second local memory.

13. A program storage device readable by a machine, embodying a program of instructions executable by the machine to perform a method for operating a network operations center which is coupled to a communications system having a router that forwards packets received from a client according to the source address of said packets, the method comprising:

receiving and storing a user profile having a pool identifier in a global memory, said pool identifier comprising an IP address pool; and responding to a request for said user profile from a first local memory coupled to a protocol gateway by transmitting said user profile to said first local memory.

14. A program storage device readable by a machine, embodying a program of instructions executable by the machine to perform a method for operating a network operations center coupled to a communications system having a router that forwards packets received from a client according to the source address of said packets, the method comprising:

receiving and storing a user profile having a pool identifier in a global memory;

responding to a request for said user profile from a first local memory coupled to a protocol gateway by transmitting said user to profile to said first local memory; and responding to a request for said user profile from a second local memory coupled to a second protocol gateway by transmitting said user profile to said second local memory.

\* \* \* \* \*